United States Patent
Raman et al.

(10) Patent No.: US 9,967,241 B2
(45) Date of Patent: May 8, 2018

(54) PERSONA BASED BILLING

(71) Applicants: CELLCO PARTNERSHIP, Basking Ridge, NJ (US); VERIZON PATENT AND LICENSING INC., Basking Ridge, NJ (US)

(72) Inventors: Uma V. Raman, Somerset, NJ (US); Eric R. Koob, Somerset, NJ (US); Paul M. Decker, Red Hill, PA (US); Steven Mancuso, Lebanon, NJ (US); Satish Kumar Hosanagara, Flanders, NJ (US); Shashi Neelakantan, Irving, TX (US); Bilal Wahid, Bedford, MA (US); William D. Versen, Prospect Heights, IL (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 767 days.

(21) Appl. No.: 13/843,605

(22) Filed: Mar. 15, 2013

(65) Prior Publication Data

US 2014/0279454 A1    Sep. 18, 2014

(51) Int. Cl.
| | |
|---|---|
| *H04L 29/06* | (2006.01) |
| *G06Q 30/04* | (2012.01) |
| *H04L 12/701* | (2013.01) |
| *H04L 29/08* | (2006.01) |
| *H04W 12/08* | (2009.01) |

(52) U.S. Cl.
CPC ............ *H04L 63/08* (2013.01); *G06Q 30/04* (2013.01); *H04L 45/00* (2013.01); *H04L 63/0428* (2013.01); *H04L 63/102* (2013.01); *H04L 67/14* (2013.01); *H04W 12/08* (2013.01)

(58) Field of Classification Search
CPC ......... H04L 63/08; H04L 45/00; H04L 67/17; H04L 63/0428; H04L 63/102; H04W 12/08; G06Q 30/04
See application file for complete search history.

(56) References Cited

U.S. PATENT DOCUMENTS

| | | | |
|---|---|---|---|
| 7,242,922 B2 * | 7/2007 | Fieldhouse | H04W 4/24 379/114.01 |
| 9,032,480 B2 * | 5/2015 | Mindler | H04L 67/02 726/3 |

(Continued)

*Primary Examiner* — Jeffrey M Rutkowski
*Assistant Examiner* — Mandish Randhawa

(57) ABSTRACT

A mobile device receives from a first client application a request to exchange first data over a mobile communication network. The mobile device determines whether the first client application is associated with a first persona or a second persona of a user. Upon determining the first client application is associated with the first persona, the mobile device establishes a first data connection based on a first Access Point Name (APN) network identifier with the mobile communication network and routes the first data over the first data connection. The mobile device also receives from a second client device a request to exchange second data over the mobile communication network. Upon determining the second client application is associated with the second persona, the mobile device establishes a second data connection based on a second APN network identifier with the mobile communication network and routes the second data over the second data connection.

19 Claims, 13 Drawing Sheets

(56) References Cited

U.S. PATENT DOCUMENTS

| | | | | |
|---|---|---|---|---|
| 2008/0285492 | A1* | 11/2008 | Vesterinen | H04W 76/022 370/310 |
| 2008/0318616 | A1* | 12/2008 | Chipalkatti | H04W 12/08 455/550.1 |
| 2009/0109986 | A1* | 4/2009 | Zhao | H04L 29/12207 370/401 |
| 2010/0027448 | A1* | 2/2010 | Puthiyandyil | H04W 76/025 370/310 |
| 2012/0079586 | A1* | 3/2012 | Brown | G06F 21/31 726/16 |
| 2012/0084184 | A1* | 4/2012 | Raleigh | H04M 15/7652 705/30 |
| 2013/0219465 | A1* | 8/2013 | Tse | H04L 63/10 726/3 |
| 2014/0006347 | A1* | 1/2014 | Qureshi | G06F 21/10 707/621 |
| 2014/0349633 | A1* | 11/2014 | Sajadieh | H04W 8/18 455/418 |

\* cited by examiner

300A

| Overview | Account Maintenance | Orders | Billing | Reports | Support | Welcome, | | Sign Out |

Quick Tasks ▼ Settings ▼ Utilities ▼ Location: Choose Location | Wireless Coverage Locator  ≒ Cart Empty

Dual Persona

| Setup | Policy Management |

View and manage wireless numbers accounts participating in Dual Persona

310a — Accounts   310b                              310c          310d           310e

| Account Number | Price Plan | Allowance | Participating Lines | Action | |
|---|---|---|---|---|---|
| 999-001 | Mobile Broadband 100MB $120.00 | 100MB | 20 | Manage Plan | Manage Lines |
| 888-001 | Mobile Broadband 150MB $160.00 | 150MB | 30 | Manage Plan | Manage Lines |
| 777-001 | Mobile Broadband 200MB $160.00 | 200MB | 40 | Manage Plan | Manage Lines |

| Overview | Account Maintenance | Orders | Billing | Reports | Support | ○ Welcome |
|---|---|---|---|---|---|---|
| | Quick Tasks ▶ Settings ▶ Utilities ▶ Location: Choose Location | Wireless Coverage Locator | | | | ☱ Cart Empty | Sign Out |

< Back to Accounts
Dual Persona

| Setup | Policy Management |
|---|---|

Manage Lines
Manage existing lines and account association for billing or add new lines by selecting from a list of uploading a template. You may also resend invitations and remove lines from participating in program - Final verbiage TBD 320a — Account: [999-001 ▼]
320b — Search by: [User Name ▼] [_____] [Search]

[Select from List] [Upload]

320c

| Wireless Number | User Name | User Email | Company User | Enrollment Date | |
|---|---|---|---|---|---|
| 999-999-0001 | Stephen Howard | showard@demodomain.com | Bob Smith | 05/04/2006 | ☐ |
| 999-999-0002 | Payton Walker | pwalker@demodomain.com | Bob Smith | 05/04/2006 | ☐ |
| 999-999-0003 | Jean Tyhurst | jtyhurst@demodomain.com | Bob Smith | 05/04/2006 | ☐ |
| 999-999-0004 | Stephen Howard | showard@demodomain.com | Bob Smith | 05/04/2006 | ☐ |
| 999-999-0005 | Payton Walker | pwalker@demodomain.com | Bob Smith | 05/04/2006 | ☐ |
| 999-999-0006 | Jean Tyhurst | jtyhurst@demodomain.com | Bob Smith | 05/04/2006 | ☐ |
| 999-999-0007 | Stephen Howard | showard@demodomain.com | Bob Smith | 05/04/2006 | ☐ |
| 999-999-0008 | Payton Walker | pwalker@demodomain.com | Bob Smith | 05/04/2006 | ☐ |

Show [50 ▼] rows

1 | 2 | 3 | 4 | 5 | Next    [Select Action ▼]
[Move]    1 | 2 | 3 | 4 | 5 | Next    [Add] [Delete]

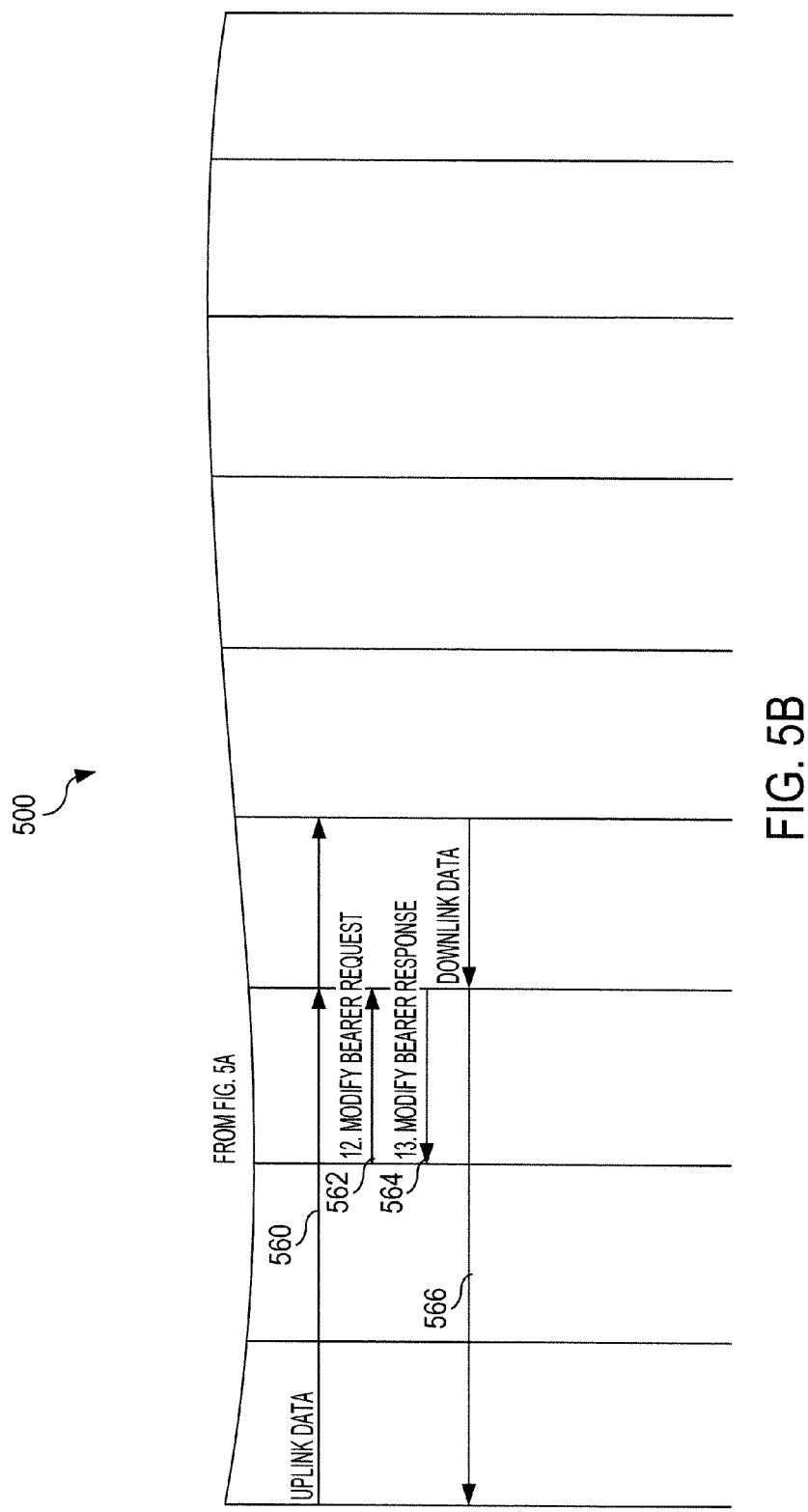

PERSONA BASED BILLING

BACKGROUND

Employees are demanding more and more that their companies' IT department support the devices they want to use. This is known as Bring Your Own Device ("BYOD") trend. Employees also prefer to carry one device that can be used for both business and personal purposes. The enterprises are looking for ways to increase employee productivity and reduce mobility costs. To strike a balance, enterprises may allow for device flexibility while at the same time investing in the platforms to address the security and management challenges presented by employees bringing their mobile devices into work.

There are several applications today such as, for example, Good for Enterprise ("Good") that provide a way to keep business data and applications on a user device separate from personal data and applications in support of the BYOD trend. The solution such as Good works by creating an encrypted block of memory on the user device (i.e. sandbox, container, etc.) where business data and applications can reside and managed separately from personal data and applications (i.e. everything else on the device). The vendors in this space have also typically provided a management tool for enterprises to create and enforce policies over the mobile device sandbox/container. For example, Good provides a tool called Good Mobile Manager that performs this policy management function over their proprietary mobile device sandbox technology.

Sandboxing/containerization technology has been around for several years. However, such technology does not address how to apply different routing and billing models for different types of data transmitted over the air between the mobile device and the wireless service provider. Mobile data generated by a subscriber has generally been considered to be in one class and billed against the account that is liable for the line of service regardless of whether the mobile data is work-related or personal related. Although the concept of providing a separate bill to the enterprise for business data usage consumed from a user's device has been discussed with customers and the analyst community, a need still exists to implement such concept and separate data consumption based on persona type (e.g., personal persona and business personal). This allows a wireless service provider to provide two types of data services for a single subscriber.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3A illustrates an exemplary user interface that may be displayed to a user under the setup tab of a persona-based data billing application;

FIG. 3B illustrates an exemplary user interface for managing lines associated with a specific enterprise persona-based data billing account;

FIGS. 5A-5B illustrate an exemplary process for establishing a data connection between the UE and the network shown in FIG. 1;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to techniques and equipments for configuring a user device to store business content and applications separate from the personal content and applications and provide separated billing for business data usage and personal data usage. To accomplish this, the user device may leverage multiple Access Point Name (APN) connections to facilitate the transmission, routing and billing of data traffic between the device and the wireless service provider based on the persona that consumed the data. Each APN connection may correspond to a different communication tunnel between the device and a specific Public Data Network (PDN). Personal data may traverse a personal PDN (e.g., Internet APN) tunnel and business data may traverse a business PDN (e.g., 800 APN) tunnel. This way the network can distinguish data associated with the business from data not associated with business and bill the customer accordingly. The business data usage, for example, may be billed to the enterprise's account and the personal data usage may be billed to the user's personal account. In a BYOD context, the wireless service provider could sell one data service to the employee for personal data consumption and another data service to the employee's company for business data consumption. The employee may be billed and pay for the personal data consumption and the company may be billed and pay for the business data consumption.

Figure 1:
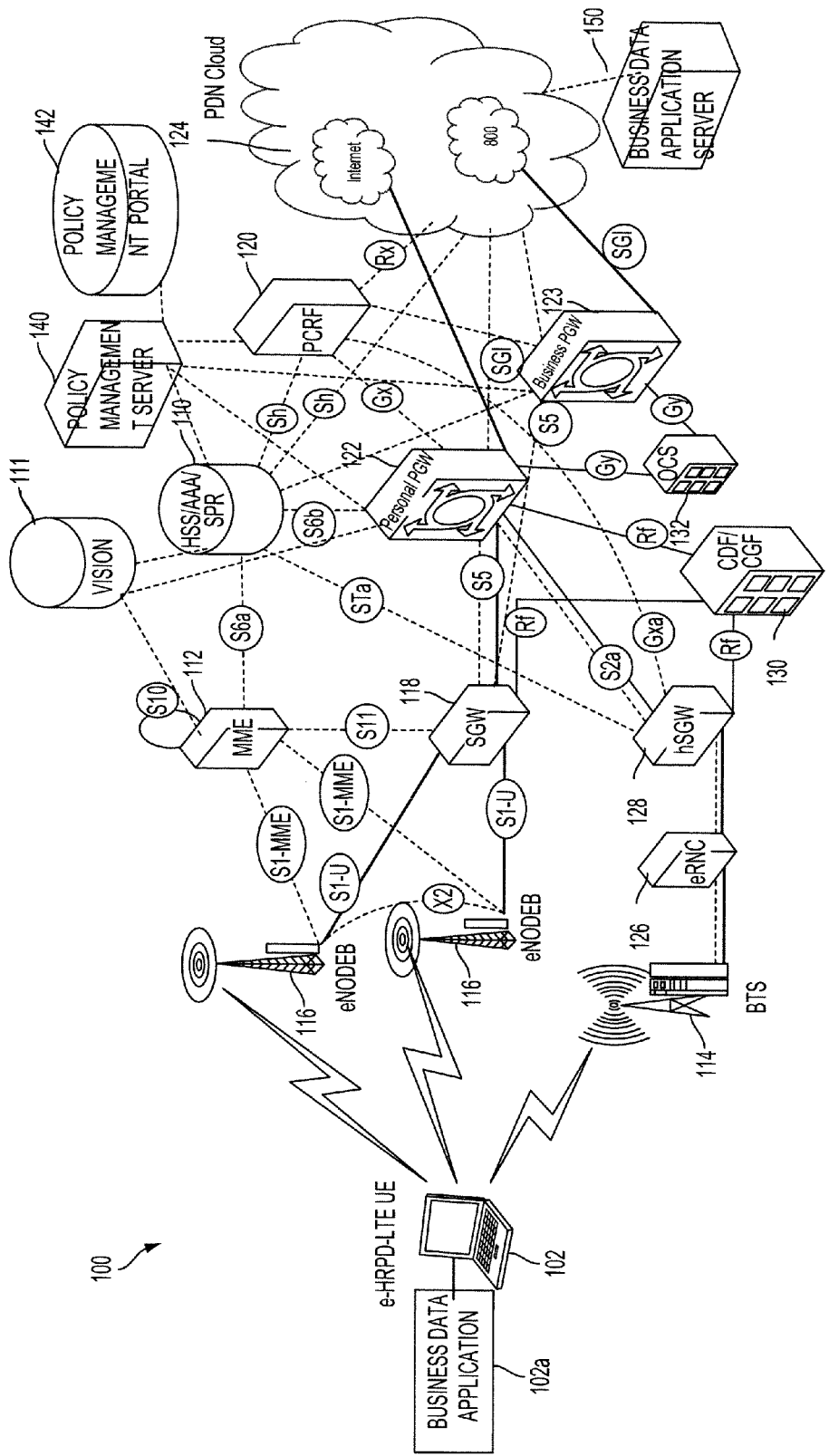
FIG. 1 is a functional block diagram describing a network allowing a user equipment (UE) to establish multiple APN data connections with the network to separate business data usage from personal data usage.

Reference now is made in detail to the examples illustrated in the accompanying drawings and discussed below. FIG. 1 is a functional block diagram describing a network 100 allowing a piece of user equipment (UE) to establish multiple APN data connections with the network 100 to separate business data usage from personal data usage. The network 100 may have all of the features, hardware, and systems of other networks, however, in this example, only the relevant portions of the network are described. The network 100 can have a Home Subscriber Server (HSS) 110. The HSS 110 evolved from a Home Location Register (HLR). In 3GPP networks, and particularly in the LTE architecture (for 3G and 4G networks), the HSS 110 can be a database of user (subscriber) information, i.e., customer profiles. The user information may include account information, account status, user preferences, features subscribed to by the user, user's current location, and allowable APNs. In roaming scenarios, the HSS 110 in the network 100 provides the user profile to a Mobility Management Entity (MME) 112.

The MME 112 is a control-node for the LTE access-network, in that it can be a single point (or "node") within the network that integrates numerous core functions and control over network flow, load sharing, etc. It can be responsible for tracking, paging, and retransmission procedures to the UE 102. The MME 112 can also be involved in the UE's activation/deactivation of service flows (also known as bearers) and is also responsible for authenticating the UE 102 when it is roaming, by interacting with the HSS 110. The UE 102 through the base station 114 or one of the eNodeBs 116 and the Serving Gateway (SGW) 118, and MME 112, registers and authenticates with the network 100. The network 100 includes LTE servers such as, for example, Policy Control and Charging Rules Function (PCRF) 120, MME 112, personal PDN Gateway (PGW) 122, business PGW 123, and the SOW 118. The network 100 also includes PDN servers located in the PDN cloud 124. The PDN cloud 124 may include Internet PDN and 800 PDN. The authentication procedure between the UE 102 and the MME 112 can involve multiple messages per current 3GPP standards (Authentication Request/Response, Security Mode Command/Complete, etc).

The HSS 110 communicates with the MME 112 using an S6a protocol. The communication between HSS 110 and the MME 112 may traverse zero, one, or multiple diameter proxies. In the illustrated example, the communication occurs through no diameter proxies. The diameter proxy is a border gateway for the diameter protocol. The diameter protocol is a next generation Authentication, Authorization, and Accounting (AAA) protocol for IP communication networks. The protocol facilitates the exchange of AAA related information within the network. The S6a protocol enables transfer of profile and authentication data for authenticating/authorizing user access between the HSS 110 and the MME 112. The MME 112 can be responsible for a number of tasks, as noted above.

The PCRF 120 is configured to specify the QoS for the bearer based on a QoS Class Identifier (QCI) and ensures such specification is in accordance with the user's subscription profile stored on the HSS 110. The subscriber profile may include information about the subscriber. The information may include, for example, the MDN associated with the UE 102 and the various services subscribed to by the subscriber. The subscriber profile on the HSS 110 may also include information about which APNs the UE 102 is allowed to access. The APN may be a parameter used by the UE 102 to inform the network 100, which PGW (e.g., personal PGW 122 or business PGW 123) the UE 102 is requesting to use for communication with the network 100. The APN may include the personal APN and business APN. The personal APN may correspond to the Internet APN, and the business APN may correspond to the 800 APN.

To illustrate one specific example, when the Internet browser is selected on the UE 102, the attach request from the UE 102 to the network 100 may reference the Internet APN. The MME 112 may receive the attach request for the Internet APN and may send the request to the personal PGW 122. The personal PGW 122 may then create a personal tunnel from the UE 102 to the Internet. The personal tunnel may be from the UE 102 to the Internet PDN. The personal PGW 122 may first check with HSS 110 to confirm that the UE 102 is authorized to use the personal PGW 122 to access the Internet. The UE 102 by virtue having subscription with the mobile communication network provider may be registered to access the personal PGW 122. The traditional Internet usage, for example, accessing Facebook, Twitter or just Internet browsing using the Internet explorer application on the UE 102 may go through the personal tunnel. The traffic associated with the personal tunnel may be charged to the user's personal account on the VISION 111 and appear on the user's monthly bill.

In support of persona-based data billing, the network 100 also includes business PGW 123. The business PGW 123 is added to separate business traffic from all traffic associated with other PGWs (e.g., the personal PGW 122). The business PGW 123 may only be connected to the IP addresses of the businesses that subscribe to persona-based data billing. The UE 102 may request connection to the business PGW 123 by sending the 800 APN attach request to the MME 112. The UE 102 may only send the request for the 800 APN while the user is in active in the business persona. The business persona is active or selected when the user is operating within the space of the business data application 102a on the UE 102. The business persona is not active or selected when the user is not operating within the business data application 102a on the UE 102. When the user is not operating within the space of the business data application 102a on the UE 102, the user is said to be active in the personal persona. The MME 112 may receive the attach request for the 800 APN and may send the request to the business PGW 123. The business PGW 123 may then create a business tunnel from the UE 102 to the IP addresses of the business that subscribes to the persona-based billing. The business PGW 123 may first check with HSS 110 to confirm that the UE 102 is authorized to use the business PGW 123. The HSS 110 may include an indicator that the UE 102 is registered for the persona-based billing and may indicate the same to the business PGW 123. The UE 102 may be registered for the persona-based billing by the user's employer.

In one specific example, the user of the UE 102 provides consent to the user's employer to be registered for persona-based data billing service. In response, the employer adds persona-based billing feature to the Mobile Directory Number (MDN) associated with the UE 102 and assigns business applications to the user. The communication network provider may assign rating groups to the persona-based billing account. The rating group may be associated with a collection of IP addresses. The collection of business IP addresses may be associated with the business applications assigned to the user. These information may be registered with the network at VISION 111, for example. For example, the VISION 111 may maintain the rating group to the persona-based billing account relationship. The business POW 123 may maintain the IP addresses to the rating group relationship. The HSS 110 may also store information regarding the employee being registered for the persona-based data billing and allowed to access the business PGW 123.

The enterprise may first register for policy management service at policy management server 140 to provide the UE 102 with a business data application 102a. The business data application 102a may be configured to facilitate the secure containerization of business data on the UE 102, To this end, the business data application 102a is configured to separate the business content and applications on the UE 102 from the personal content and applications and to provide separate billing for business traffic usage and the personal traffic usage. The policy management server 140 is also configured to create and enforce policies over the business data application 102a. To this end, upon creating an account with the policy management server 140, the enterprise may create a dual persona group under its policy management account, identifying employees for which the enterprise wishes to pay for their work-related data usage. The enterprise also creates a persona-based data billing account with the network 100. The persona-based data billing account may be created in VISION 111 and may identify the collection of IP addresses (e.g., rating groups) used by the business data application 102a for which the data usage should be charged to the enterprise. The VISION 111 maintains the record of the authorized employees and rating groups and allows for business traffic associated with one of the rating groups to be charged to the enterprise's account and other traffics to be charged to the user's personal account.

The UE 102 is configured to establish two data connections with the network 100—one with personal PDN through the personal PGW 122 and one with business PDN through the business PGW 123. Moving forward, it is assumed that the personal PDN corresponds to the Internet PDN, and the business PDN corresponds to the 800 PDN. However, it is understood that the personal and business PDNs can correspond to other types of PDNs as well (e.g., IMS PDN, Admin PDN, App PDN). The business traffic originating from the business data application 102a may be routed over the business PGW 123 toward the 800 PDN and may be charged to the enterprise; whereas, the personal traffic origination from applications not housed within the business data application 102a may be routed over the personal PGW 122 toward the Internet PDN and may be charged to the user's personal account. This may allow the UE 102 to be used for both business and personal purposes. In one specific example, the user may take the UE 102 to the user's work and use the device for at least some portion of the day for work. The personal data may traverse over the personal PGW 122 toward the Internet PDN and may be captured and charged to the user's account on the mobile communication network. The work data may traverse over the business PGW 123 toward the 800 PDN and may be captured and charged to the employer's account on the mobile communication network.

When the UE 102 setups data connection with each PDN, such as the Internet PDN or the 800 PDN, a data session may be created. Each data session may have one default bearer. Each bearer may be associated with one QCI. For example, when the UE 102 is connected to the Internet PDN and 800 PDN, two data sessions are set up. Each data session has one default bearer. Each default bearer is assigned with one QCI. Based on the subscriber profile, the PCRF 120 may determine the QCI that default bearer may use and then pass this information to the personal PGW 122 or the business PGW 123 during the data session setup depending on the APN used in the attachment request from the UE 102. For the Internet APN, the PCRF 120 may pass the QCI information to the personal PGW 122. For the 800 APN, the PCRF 120 may pass the QCI information to the business PGW 123. The PGW (e.g., the personal PGW 122 or the business PGW 123 depending on the APN) may then set up a data session and default bearer with the proper QCI. The PGW is configured to assign IP addresses to the UE 102. The PGW is also responsible for QoS enforcement based on the specified QoS by the PCRF 120. The SGW 118 is configured to receive the user's IP packets. The SGW 112 is also configured to serve as a mobility anchor for the bearers when the UE 102 moves from one eNodeB 116 to another. In the illustrated example, the MME 112 also communicates with the base station/antenna 114 to receive information and requests information from the UE 102.

The UE 102 is shown to be a laptop but can take other forms. For example, the UE 102 can take the form of portable handsets, smart-phones or personal digital assistants, although they may be implemented in other form factors. Program applications, including the business data application 102a for supporting multiple APN connections can be configured to execute on many different types of mobile devices. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

As noted above, the business data application 102a may be a mobile application that is configured to keep separate business data and applications on the UE 102 from the personal data and applications. To this end, the business data application 102a may create an encrypted block of memory on the UE 102 (e.g., a container) where business data and applications reside and managed separately from personal data and application. In one implementation, the business data application 102a may look like other mobile applications and may be selectable by the user. Upon selection, the business data application 102a may grant user access to the business-related applications housed within the business data application 102a. The business-related applications may include work e-mail, work calendar, and other work-related applications. The business data application 102a may be downloaded on the UE 102 through the network 100 and via instructions from the enterprise associated with the user.

The enterprise may be provided with management tool to create and enforce policies over the business data application 102a. The management tool may include the policy management service offered by the policy management server 140. The enterprise may contact the communication network provider (e.g., Verizon) and sign a policy management agreement with the communication network provider to access the policy management server 140. Upon execution of the agreement, the communication network provider creates a policy management account for the enterprise at the VISION 111. The account may include enterprise account number associated with the policy management service, billing information, and employees' information. The enterprise may be able to pay a monthly fixed fee for the policy management service regardless of the number of employees registered for the policy management service or may be charged a monthly fixed fee based on the number of employees registered for the policy management service. In one example, the enterprise may be charged a fixed fee for the policy management service based on the type of applications registered for the policy management service.

The policy management server 140 provides the enterprise access to the Policy management portal 142. The policy management portal 142 includes work-related applications that the enterprise may wish to distribute to the employees' devices based on the policy group and/or device type associated with the employees. Upon accessing the policy management portal 142, the enterprise may create various groups and may assign its employees to one or more of the various groups. The various groups may include groups based on line of business (e.g., sales, engineering). The enterprise registers its employees to one or more of the various groups by providing the employees credentials to the policy management portal 142. The types of applications distributed to the employees may depend on the group with which the employees are registered. For example, the employee registered with the sales group may receive one set of applications; whereas, the employee registered with the engineering group may receive another set of applications. The policy management portal 142 saves the employee's credentials for later authenticating the employee and confirming whether or not the employee is registered for the policy management service.

The enterprise wishing to support BYOD policy may create a group for BYOD employees. The enterprise may then register the employees to this group and identify various policies for this group. The various policies may include for example, the employees installing the business data application 102a on their devices. The business data application 102a may be downloaded from the policy management portal 142 to the UE 102. For example, upon registering the employee in the BYOD group, the enterprise IT administrator may send a notification to the employee requesting the employee to access the policy management portal 142 for work-related applications. The notification may be in the form of a link in an e-mail for example. The notification may include login credential information. The login credential information may be in a form of username and password. Alternatively, the notification may not include login credential information and may inform the employee to access the policy management portal 142 with the employee's credentials presently registered with the enterprise IT department.

The employee may select the link in the notification to receive work-related application on the policy management portal 142. Responsive to the selection of the link, the UE 102 (or the policy management client on the UE 102) may send a download request message to the policy management server 140 for downloading the work-related applications. The policy management server 140 may request the employee to provide login credential information. The employee in response provides his/her login credentials. If the provided login credentials do not match the login credential stored in the policy management server 140, the policy management server 140 may deny the employee access to the policy management portal 142. If the provided login credential match the login credential stored in the policy management server 140, the policy management server 140 may distribute from the policy management portal 142 the work-related applications associated with the employee to the UE 102. The policy management portal 142 houses the work-related applications.

In one implementation, the policy management server 140 identifies the enterprise associated with the employee and provides the employee with the applications associated with that specific enterprise. The policy management server 140 may ask the employee to identify the enterprise associated with the employee. Alternatively or additionally, the policy management server 140 may obtain this information from the credentials of the employee. In either case, the policy management server 140 distributes to the employee the work-related applications stored in the policy management portal 142 and associated with the employee's enterprise. The policy management server 140 also determines the group associated with the employee and provides the employee with the specific applications assigned to that group. In keeping with the previous example, if the employee is associated with the BYOD group, the policy management server 140 provides the employee with the business data application 102a. In one example, the policy management server 140 may automatically push the business data application 102a to the UE 102. In another example, the policy management server 140 allows the employees to download the business data application 102a to the device 102 of the employee. In yet another example, if the policy management server 140 does not host the business data application 102a, the policy management server 140 may instruct a third party server (e.g., the business data application server 150) to push the business data application to the UE 102. To this end, the policy management server 140 may provide the business data server 150 with information identifying the employee and/or the UE 102 associated with the employee. For example, the policy management server 140 may provide the employee's e-mail address and/or the MDN of the UE 102 to the business data server 150. The business data server 150 then pushes the business data application 102a to the UE 102.

The business data application 102a may be configured with preset policies or may connect with the policy management server 140 and/or the business data server 150 to download such policies. The latter scenario is described in more details with FIG. 9. The policies may include instructions for causing the business data application 102a to connect to the business PGW 123 and establish a business data tunnel between the UE 102 and the 800 PDN. The business tunnel may only be used for exchanging business-related traffic between the UE 102 and the network 100. The personal-related traffic may travel over the personal tunnel established between the UE 102 and the Internet PDN. The personal tunnel may be established using the personal APN in the attachment request from the UE 102 to the MME 112. The business tunnel may be established using the business APN in the attachment request from the UE 102 to the MME 112. Moving forward it is assumed that the personal APN corresponds to the Internet APN, and the business APN corresponds to the 800 APN. However, it is understood that the personal and business APNs can correspond to other types of APNs as well (e.g., IMS APN, Admin APN, App APN). The type of APN (e.g., Internet APN or the 800 APN) used in the attachment request may be identified based on the active persona of the UE 102. The active persona of the UE 102 depends on whether the user is operating within the environment of the business data application 102a. If the user is operating within the environment of the business data application 102a, the business person is active and the attachment request includes the 800 APN. If the user is operating outside the environment of the business data application 102a, the personal persona is active and the attachment request includes the Internet APN.

To illustrate one specific example, when a customer uses an Internet browser on the UE 102 to access X1Y2.com, the customer enters the URL www.X1Y2.com in the address bar of a web browser application on the UE 102. The web browser forwards the URL to the http handler. The http handler sends a data connection request to the MME 112 referencing the Internet APN. The MME 112 identifies that the data connection request is for the Internet APN and send the request to the personal PGW 122. The personal PGW 122 receives the request and checks with the HSS 110 to confirm that the UE 102 is eligible for such a connection. The subscriber profile on the HSS 110 or the AAA may include information about which APNs the UE 102 is allowed to use for attachment to the network 100. For example, if the Internet APN does not exist in the subscriber profile, the personal PGW 122 does not establish the personal tunnel between the UE 102 and the Internet PDN. If the Internet APN exists in the subscriber profile, the personal PGW 122 establishes the personal tunnel between the UE 102 and the Internet PDN. The UE 102 may then retrieve the web page associated with X1Y2.com. The data usage associated with visiting various links while using X1Y2.com may be charged to the customer.

Now, when the customer uses the business data application 102a to access the network, the business data application 102a sends a data connection request to the MME 112 referencing the 800 APN, The MME 112 identifies that the data connection request is for the 800 APN and send the request to the business PGW 123. The business PGW 123 may check HSS 110 to determine if the UE 102 is eligible for this connection. If the 800 APN does not exist in the subscriber profile, the business PGW 123 does not establish business tunnel between the UE 102 and the 800 PDN. If the 800 APN exists in the subscriber profile, the business PGW 123 establishes the business tunnel between the UE 102 and the 800 PDN. In one implementation, the business PGW 123 may check to determine whether the destination IP address is registered with the firewall at the business PGW 123. If the destination IP address is not registered with the firewall, the business PGW 123 may deny the connection request to the destination IP address. If the destination IP address is registered with the firewall, the business PGW 123 may allow the connection request to the destination IP address. The enterprise may register with the firewall at the business PGW 123 the destination IP addresses for which the UE 102 is allowed to access using the business tunnel.

In this manner, the business traffic travels through the business tunnel and the personal traffic travels through the personal tunnel from the UE 102 to the PDN cloud 124. Since each tunnel is associated with a different PGW and associated with a different APN, the network can distinguish between the personal usage and the business usage and can bill the appropriate entity accordingly. Specifically, the usage over the personal tunnel may be personal usage and the usage over the business tunnel may be business usage. The records are created for personal PGW 122 and charged to the user's personal account. Similarly, the records are created for the business PGW 123 and charged to the enterprise persona-based billing account. The records for business PGW 123 may be created by monitoring the usage to a destination IP address. The business PGW 123 may have the IP to Rating group relationship, so when the call record is created, the business PGW 123 takes the usage that occurred to the destination IP address, turns that into usage to a rating group on the call record, and forwards this information to the data mediation server. The data mediation server sends this information the VISION 111. The VISION 111 is an IT system that stores the rating group to persona-based data billing account relationship. When the billing records are sent from the data mediation server to the VISION 111, the VISION 111 looks at the rating group and bills the appropriate account associated with the rating group The user of the UE 102 and the enterprise may each be charged based on a post-pay mechanism or a pre-paid mechanism. In the post-pay mechanism, the customer (e.g., the user of the UE 102 and/or the enterprise) is allowed to use the data network 100 first and pay for such usage later, for example, on a monthly basis. To this end, the network elements (e.g., the personal PGW 122 and the business PGW 123) create a usage data records showing how much data was used and to which rating group it should be charged to as the session ends and forward the records to CDF 130. In keeping with the previous example, when the user visits X1Y2.com, the personal PGW 122 generates records associated with this activity (e.g., 1 MB data usage associated with visiting X1 Y2.com) and forwards these records to the CDF 130 when the session ends. The records in the CDF 130 may be updated periodically, such as every half hour. The CDF 130 formats this data usage records and sends it to the IT billing system of the mobile communication network provider (e.g., VISION 111) to generate a billing statement for the customer based on this data usage record. This billing statement is associated with the user's personal account since it was accumulated at the personal PGW 122.

For another example, when the user launches a data session using the business data application 102a, the request is sent to the business PGW 123. The business PGW 123 generates records associated with this activity (e.g., 1 MB data usage associated with using the business data application 102a) and forwards these records to the CDF 130 when the session ends. The records in the CDF 130 may be updated periodically, such as every half hour. The CDF 130 formats this data usage records and sends it to the IT billing system of the mobile communication network provider (e.g., VISION 111) to generate a billing statement for the customer based on this data usage record. This billing statement is associated with the rating group based on the destination IP address and to the corresponding enterprise persona-based billing account since it was accumulated at the business POW 123.

In the pre-paid mechanism, the customer may be charged in real-time against a pre-paid deposit. For example, a pre-paid customer may have to deposit $100 on his/her account before being granted access to the data network 100. Once the customer's $100 on the account is exhausted, the customer's access to the network 100 is denied until the customer recharges its account. The pre-paid mechanism is supported by the OCS 132, which is a real-time charging system. In keeping with the previous example, when the user of the UE 102 launches a data session and requests access to X1Y2.com, the request is sent to the personal PGW 122. Before forwarding the customer's request to the X1Y2 server, the personal PGW 122 checks with the HSS 110 to determine how the customer should be charged for the data traffic. If the HSS 110 informs the personal PGW 122 that the customer is a post-pay customer, the personal PGW 122 allows access and bills the customer later. If the HSS 110 informs the personal PGW 122 that the customer is a pre-paid customer, the personal PGW 132 checks with the OCS 132 to determine if the customer has sufficient funds for this data usage. If yes, the personal PGW 122 forwards the customer's request to the X1Y2 server. If the OCS 132 informs the personal PGW 122 that the customer does not have sufficient funds, the personal PGW 122 stops the customer from accessing the X1Y2 server.

The personal PGW 122 is configured to monitor the data usage. When the customer launches a new data session, the personal PGW 122 sends a request to the OCS 132 to validate the customer. If the customer is valid and has money/credit, the OCS 132 grants usage allowance. For example, the OCS 132 grants a specific Mega Bytes (MB) usage allowance and returns this granted usage allowance to the personal PGW 122. In response, the personal PGW 122 allows the customer to use the data network and start monitoring the data usage. Once the granted usage allowance is used up, the personal PGW 122 sends another request to the OCS 132 to ask for an additional usage allowance. If the customer is out-of-credit, the OCS 132 denies the additional usage allowance. The personal PGW 122 may maintain the data session, and stop the customer from access to the Internet by dropping the out-going data packets.

On the UE 102 side, the UE 102 may not know the customer is out-of-credit. Therefore, the applications on the UE 102 may still attempt to send data packets since data session is still up. Based on today OS logic, when there is no incoming acknowledgement being received for the out-going data packets, after a certain time period, the OS resets the radio channel (e.g., terminates existing data session and re-establishes a new one). The PGW 122 knows if the granted usage allowance or data quota assigned to this user by the OCS 132 is used up. Once granted usage allowance is used up, the PGW 122 reports the used usage allowance and sends a request to the OCS 132 to ask for a new granted usage allowance or data quota. The OCS 132 charges the used usage allowance reported by the PGW 122 to the customer account, and then determines if the customer has enough money/credit to grant the next data quota.

For example, assume the customer has 1 GB on his/her account, the personal PGW 122 requests for quota from the OCS 132. The OCS 132 returns with granted usage allowance of, for example, 100 MB. The personal PGW 122 may then allow the customer access to the Internet. The personal PGW 122 monitors if the 100 MB has been depleted. If yes, the personal PGW 122 reports the used usage allowance of 100 MB to the OCS 132 and then sends a request for a new quota. The OCS 132 updates the customer account from 1 GB to 900 MB, and then assigns a new granted usage allowance of 100 MB to the PGW 122. Although in the above-described example, the personal PGW 122 was discussed as monitoring data usage in the pre-paid mechanism, the business PGW 123 may also monitor data usage in the pre-paid mechanism in essentially the same manner which is not repeated here for the sake of simplicity and brevity of description.

The elements within the network 100 can override persona associated with the specific data traffic. For example, if the employee attempts to access the network 100 under the personal persona using the Internet APN and the network elements determine that the employee does not have sufficient fund to proceed and is a prepaid employee, the network elements (e.g., the personal PGW 122) may instruct the UE 102 to change the Internet APN type connection request to the 800 APN type connection request to allow the employee access to the specific data. The network elements may first generate a notification to the enterprise IT department to confirm such modification is acceptable. The enterprise IT department may review the connection request and may determine that the usage is really business usage and should have been triggered under the business persona instead of the personal persona and therefore may approve the connection request. In this scenario, the network elements may charge the enterprise for the data connection instead of the employee. In a slightly different implementation, the network elements may not change the nature of the connection from the Internet APN connection to the 800 APN connection instead they may simply change the entity for which the bill should be generated (e.g., from the employee to the enterprise). Similar to the previous scenario, once the network elements determine that the employee does not have sufficient fund to proceed and is a prepaid employee, the network elements (e.g., PGW 122) may generate a notification to the enterprise IT department to inform the enterprise IT department of such usage and seek confirmation of the enterprise IT department to bill the enterprise for the data service. In response, the enterprise IT department may review the connection request and may determine that the usage is really business usage and should have been triggered under the business persona instead of the personal persona and therefore may approve the data usage to be charged to the enterprise persona-based data billing account. In this scenario, the network elements may charge the enterprise for the data traffic instead of the employee.

Moving forward, the UE 102 may be a 4G device that can communicate with the personal PGW 122 and the business PGW 123 through the eNodeB 116 and SGW 118. The 4G device operating in non-LTE environment can still utilize the 4G network through the BTS 114, the enhanced Radio Network Controller (eRNC) 126, and the hSGW 128. The BTS 114 receives the radio signals from the UE 102 and passes the signals to the eRNC 126 which may forward the signals to the hSGW 128. The functionality of the hSGW 128 is similar to that of SGW 118 except the hSGW 128 also acts as an interface between the 3G network and the 4G network.

To allow for separate billing, the enterprise may have to first to buy data services from the mobile communication network provider (e.g., Verizon Wireless™). To this end, the enterprise would have one account for policy management service and one account for persona-based data billing for its employees with the mobile communication network provider. The enterprise may create such an account in VISION 111. Once the persona-based data billing account is created, the enterprise may select a data plan from among a plurality of data plans. Each of the different data plans may allow the enterprise to enroll up to certain number of employees. For example, a 500 GB data plan may allow the enterprise to enroll up to 250 employee devices for receiving split billing associated with persona-based data billing. For another example, a 1000 GB data plan may allow the enterprise to enroll up to 1000 employee devices for receiving split billing associated with persona-based data billing. Once the persona-based data billing account is created and the data plan is selected, this information may be provided to the policy management server 140. The policy management server 140 updates the policy management portal 142 to associate the data service account of the enterprise with the policy management account of the enterprise.

Figure 2:
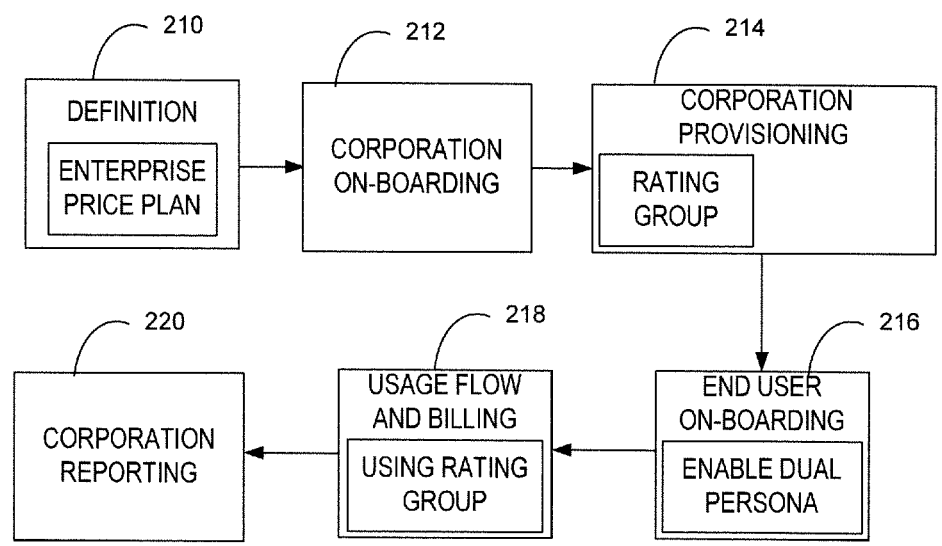
FIG. 2 illustrates an exemplary process for establishing a persona-based data billing account and registering employees to the persona-based data billing account.

FIG. 2 illustrates an exemplary process 200 for establishing persona-based data billing account and registering employees to the persona-based data billing account. The process 200 begins with presenting a dual persona data plan to the enterprise interested in paying for its employees' business data usage (Step 210). The dual persona data plan may be presented to the enterprise at the point of sale (POS) or at a web interface. The web interface may include the policy management portal 142.

The enterprise may interact with the sales representative to set up the persona-based data billing account (also referred to as corporation on-boarding) (Step 212). The sales representative interacts with the enterprise and contract may be setup in the ECPD. The ECPD may be updated with a dual persona enrolled indicator. The VISION 111 may also be updated to reflect the persona-based data billing account of the enterprise. The policy management server 140 updates the policy management portal 142 to include a persona-based data billing application for allowing the enterprise to register its employees to the persona-based data billing account. Upon selecting the persona-based data billing application the enterprise may be directed to a plurality of tabs within the persona-based data billing application. The plurality of tabs includes a setup tab and a policy management tab. Under the setup tab, the enterprise may access the enterprise's accounts associated with the persona-based data billing. The enterprise may have several accounts associated with persona-based data billing or may have one account associated with persona-based data billing. The several accounts may be necessary if the enterprise wishes to assign different data plans for the different accounts. The different accounts may be created to distinguish among the employees of the enterprise. For example, the enterprise's upper management employees may be assigned to one account with a greater data access than the account associated with the employees working under the upper management. Alternatively, the enterprise's upper management employees may be assigned to one account with a lower data access than the account associated with the employees working under the upper management because fewer upper management employees exist as compared to employees working under the upper management. This scheme can utilize different enterprise persona-based data billing accounts for different groups of employees. For example, the upper management may be associated with one group of enterprise persona-based data billing account and the employees working under the upper management may be associated with another group of enterprise persona-based data billing account. In this manner, business data usage by an employee in one group does not affect the amount of available data to the employees in the other group.

The persona-based data billing accounts may be displayed to the enterprise. The persona-based data billing accounts may be displayed in a grid view with the following information: account number, price plan description, allowance, participating lines, and/or action column. The participating lines may indicate the total count of wireless numbers enrolled within the account in real time for the persona-based data billing. The action column may include an option to manage plans and an option to manage lines. The option to manage plans may allow the enterprise to update the price plan associated with the account. The option to manage lines may allow the enterprise to view the lines currently enrolled in the persona-based data billing account and may further allow the enterprise to add and/or delete lines from the account.

FIG. 3A illustrates an exemplary user interface 300A that may be displayed to the user under the setup tab of the persona-based data billing application. The user interface 300A includes account column 310*a*, price plan column 310*b*, an allowance column 310*c*, participating lines column 310*d*, and action column 310*e*. The account column 310*a* displays various accounts of the enterprise enrolled for the persona-based data billing. The price plan column 310*b* displays the tier plan associated with each account. For example, the account 999-001 is associated with $120.00 plan per month; whereas, the account 888-001 is associated with $150.00 plan per month. The allowance column 310*c* displays the allowed data usage for each plan per month. For example, $120.00 plan per month may be associated with the 100 MB of data usage per month; whereas, the $150.00 plan per month may be associated with the 150 MB of data usage per month. The participating lines column 310*d* displays the number of allowable participating lines per plan. The $120.00 plan per month may be associated with the maximum of 20 participating lines; whereas, the $150.00 plan per month may be associated with maximum of the 150 MB of data usage per month may be associated with the maximum of 40 participating lines. The action column 310*e* displays a manage plan action link and a manage line action link.

Referring again to FIG. 2, the enterprise creates a rating group for the persona-based data billing account (Step 214). The rating group is a collection of IP addresses used by the enterprise applications in the business data application 102*a*. In one example, the rating group may be mapped to a maximum of 8 IP addresses. The limitation of 8 IP addresses may be due to a specific design implementation. Other implementations are contemplated. For example, the rating group may be mapped to more than or less than 8 IP addresses. The rating group, the persona-based data billing account, and the policy management account of the enterprise may be mapped in the HSS 110. The enterprise may provide one or more IP addresses to the persona-based data billing application. The persona-based data billing application registers with the HSS 110 the one or more IP addresses as the IP addresses for which an 800 APN connection is authorized. The IP addresses may correspond to work e-mail or other work-related applications.

The enterprise may register employees to the enterprise persona-based data billing account (Step 216). The enterprise may add wireless lines of the employees to the enterprise persona-based data billing account. In one example, the enterprise IT administrator manually enters the wireless lines associated with the employees in the persona-based data billing application. In another example, the persona-based data billing application automatically receives this information from the IT servers via instructions from the enterprise IT administrator. The wireless numbers of the employees are received by the persona-based data billing application through one or more of the above-described procedures and may be validated to ensure they are active as described in more details with respect to FIG. 3B.

FIG. 3B illustrates an exemplary user interface 300B for managing lines associated with a specific enterprise persona-based data billing account. The user interface 300B appears when the user selects the manage lines link in the user interface 300A. The user interface 300B includes an account field 320*a*, a search field 320*b*, and a result field 320*c*. The account field 320*a* displays lines associated with account 999-001. The user can select a different account number from the dropdown menu option on the account field 320*a* and the user interface 300B may automatically refresh with lines associated with the newly selected account. The search field 320*b* may allow the user to conduct a search based on a username or a wireless number. When the search is complete, the result associated with the search criteria may be displayed in the result field 320*c*. If no specific search criteria are specified in the search field 320*b*, the result field 320*c* may display all lines currently registered within the selected account. The display may include the wireless numbers, user names, user e-mails, company user, enrollment date and check box column. The company user (e.g., enterprise IT administrator) may be the user who registered the employee and the employee's wireless number with the account. The check box column may allow the enterprise IT administrator to select/deselect all wireless numbers, as well as individual wireless numbers, in the search field 320*c*.

When a selection occurs, the enterprise IT administrator may have the option to move a line to a different account for billing by selecting a move icon or may have the option to delete the number from the account by selecting the delete icon. If no existing lines are available under the account, the result field 320c may display a message indicating the same to the enterprise IT administrator. The enterprise IT administrator may also have the option to add a line to the account by selecting an add icon.

Selecting the add icon may result in a display of available lines to be added to the account. The lines may be identified as described above and may be validated to confirm the lines are active and within the mobile communication network provider billing system. The lines may also be checked to ensure that they are associated with a specific type device (e.g., a 4G device) in the implementation in which the persona-based data billing is supported for specific type devices. If the line is not active (e.g., suspended), is not associated with the mobile communication network provider, or is not associated with a specific type of device, the line may not be displayed among the available lines. The enterprise IT administrator may select from the available list and may also select an e-mail to be sent to the e-mail address of the employees enrolled for the persona-based data billing. When the enterprise IT administrator selects the submit icon, the lines selected may receive a free text message informing the employees that they have been registered for persona-based data billing and may not be charged for business usage associated with the business data application 102a. The message may also result in communication of policies to the business data application 102a to configure the business data application 102a or the UE 102 to connect to the 800 PGW 123 using the 800 APN in the attachment request. For example, the message may include a feature code which may turn on the 800 APN access on the UE 102. Therefore, each time the user is operating within the environment of the business data application 102a, data communication may travel over the 800 APN connection instead of the Internet APN connection.

Figure 3C:
FIG. 3C illustrates an exemplary user interface for managing plans associated with a specific enterprise persona-based data billing account.

FIG. 3C illustrates an exemplary user interface 300C for managing plans associated with a specific enterprise persona-based data billing account. The user interface 300C appears when the user selects the manage plan link in the user interface 300A. The user interface 300C may display the selected account (e.g., 999-001) and the current plan for the selected account. The display interface may also display other available plans to the enterprise IT administrator to allow the company user to change from the current plan to another plan if desired.

After the employees are enrolled with the persona-based data billing, the employees' usage flow may be monitored and billed to either the employee or the enterprise depending on the type of the usage (Step 218). The business generated traffic may be billed to the enterprise and the personal generated traffic may be billed to the employee. To illustrate one specific example, the employee can use the business data application 102a to access work e-mail. The IP address associated with the e-mail server may be previously registered with the business PGW 123 since the e-mail server is a work-related server. Since the business data application 102a is being used, a request to access the work e-mail may go through the business PGW 123 based on the 800 APN used in the attachment request to the network 100. The business PGW 123 generates records associated with this activity (e.g., 1 MB data usage associated with accessing the work e-mail) and forwards these records to the CDF 130 when the session ends. The records in the CDF 130 may be updated periodically, such as every half hour. The CDF 130 formats this data usage records and sends it to the IT billing system of the mobile communication network provider (e.g., VISION 111) to generate a billing statement for the customer based on this data usage record. This billing statement is associated with the rating group based on the destination IP address and to the corresponding enterprise persona-based billing account since it was accumulated at the business PGW 123.

Figure 4:
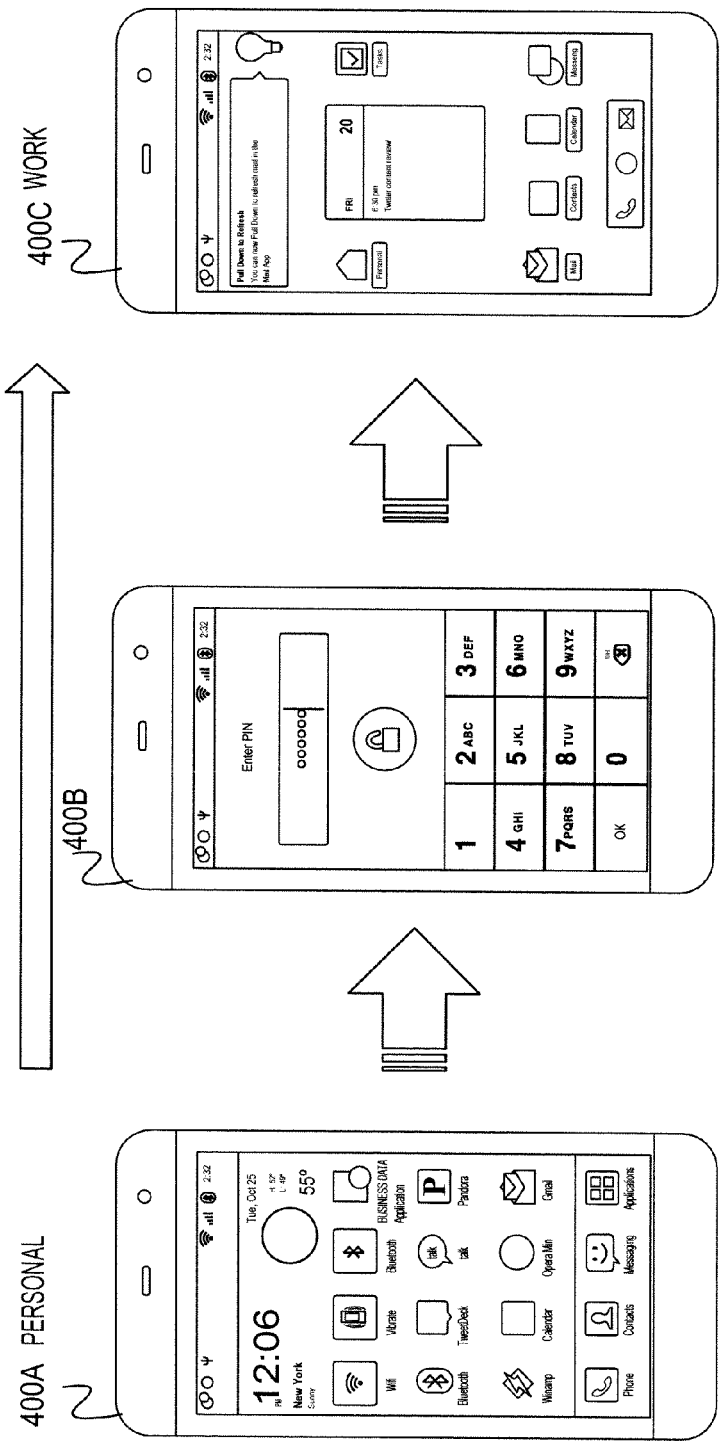
FIG. 4 illustrates an exemplary process for accessing the a business data application on the UE shown in FIG. 1.

FIG. 4 illustrates an exemplary process 400 for accessing the business data application 102a. The user interface 400A shows a plurality of applications. The plurality of applications include, among others, business data application 102a, WiFi application, Gmail application, Pandora application etc. The user may select the business data application 102a to access the user's work-related applications. Upon selecting the business data application 102a, the user interface 400B is presented to the user seeking authentication information. The authentication information may be in the form of username and password or just a password as shown in this case. The authentication information may be previously provided to the user by the enterprise (e.g., the IT department of the enterprise). The enterprise may provide this information to the user, for example, when the enterprise informs the user of being enrolled in the persona-based data billing. Alternatively, the authentication information may be created by the user and may correspond to the work-related authentication information. Upon entering valid authentication information, the user interface 400C is presented to the user. The user interface 400C displays a plurality of work-related applications. The work-related applications may reside on the UE 102 or may be hosted on the policy management portal 142. The work-related applications include, among others, mail application, contacts application, calendar application, messaging application, etc.

The business data application 102a sets up a secure container on the UE 102 for housing the business persona. The data usage incurred by the user while in the business persona may be billed to the users' employer. To accomplish this, the business data application 102a is configured to utilize business tunnel established using the 800 APN. Any data requests made by the device while in the business persona may only be sent over business tunnel. The enterprise may have full control over the business persona. This may include full control over the applications that are installed in the business persona, as well as the ability to set password standards, lock the device or the business data application 102a, wipe the business data application 102 from the device as well as other management functions. The enterprise may have the ability to control the business persona via the policy management service offered by the policy management server 140. In the implementation in which the business data application 102a is hosted by a third party (e.g., the business data server 150), the policy management server 140 may be connected with the third party server (e.g., business data server 150) to control the business data application 102a.

Figure 5A:
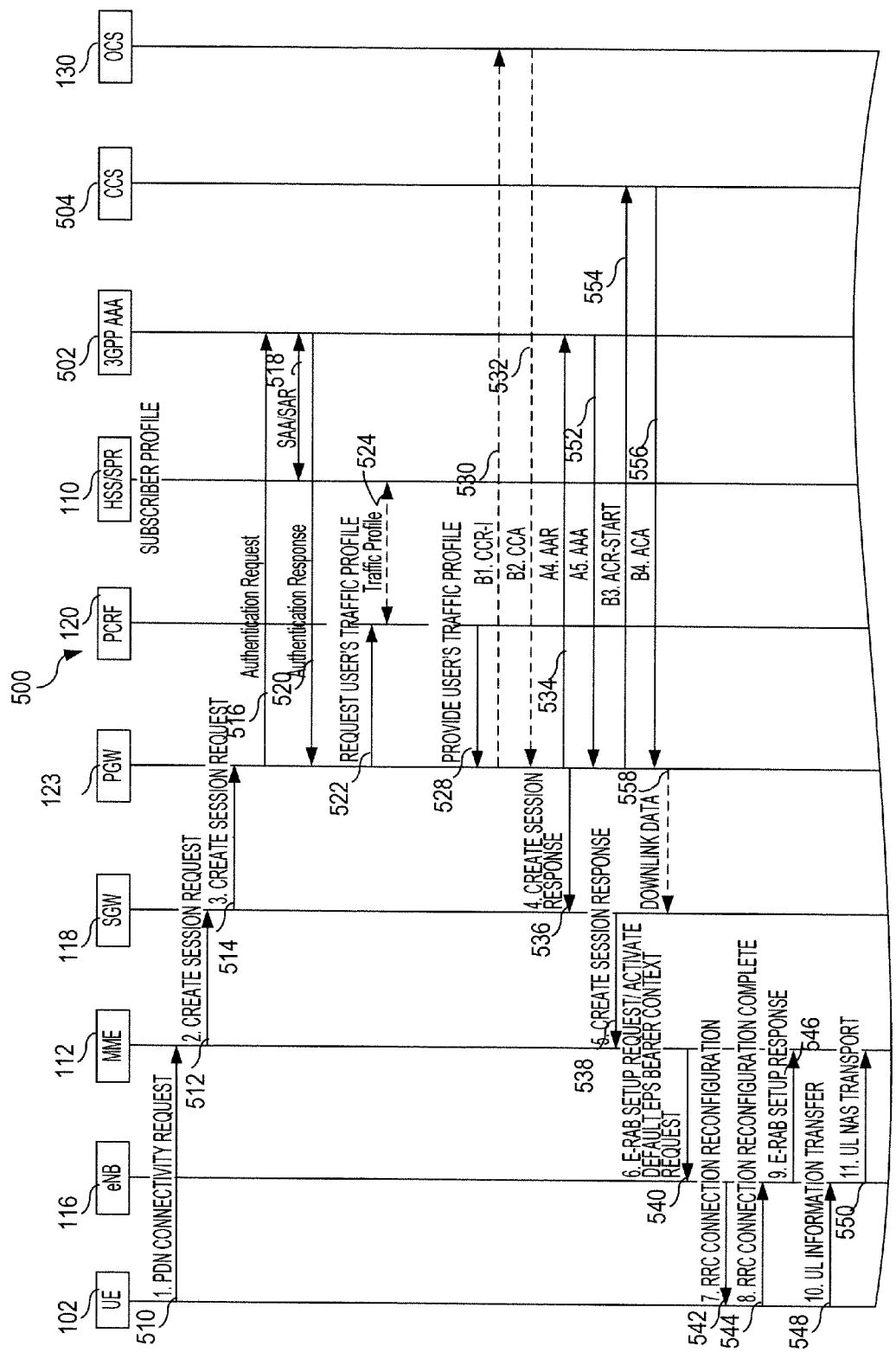

FIGS. 5A-5B illustrate an exemplary process 500 for establishing a data connection between the UE 102 and the network 100. The elements performing the various steps of the process 500 include UE 102, eNB 116, MME 112, SGW 118, PGW 122/PGW 123, PCRF 120, HSS 110, and OCS 130. These elements are similar to those shown in FIG. 1. Therefore, for the sake of brevity of description and simplicity, they are not described here in more detail. The process 500 also involves AAA 502 and CCF 504. The AAA 502 authenticates the PDN connection requests received from the UE 102. For example, the AAA 502 determines whether the UE 102 is authorized to request a specific APN connection. The CCF 504 acts as a counter and keeps track of the data usage associated with different data connections between the UE 102 and the network 100.

The process 500 begins with the UE 102 initiating an attachment request to the MME 112 via the eNB 116 (Step 510). The attachment request may specify the type of the APN based on the active persona on the UE 102. The APN may correspond to the Internet APN or the 800 APN. In keeping with the previous example, it is assumed that the APN corresponds to the 800 APN. The attachment request is sent to the MME 112. The MME 112 recognizes that the request is for the 800 APN and forwards the request to the appropriate network entities for establishing a business tunnel between the UE 102 and the 800 PDN. If the business tunnel already exists, the UE 102 does not create a new connection and instead creates a new data session with a new session ID over the existing business tunnel.

The MME 112 receives the connection request and in response sends a Create Session Request message to the SGW 118 (Step 512). The SGW 118 forwards the Create Session Request message to the business PGW 123 (Step 514). The MME's 112 selection of the SGW 118 and the business PGW 123 depends on configuration parameters specified in the attachment request. For example, the MME 112 may select the SGW 118 and the business PGW 123 based on the APN specified in the attachment request. Specifically, the MME 112 identifies the business PGW 123 that provides the 800 APN connectivity and that is closest to the subscriber location. Based on the identified business PGW 123, the MME 112 selects the SGW 118.

The business PGW 123 receives the Create Session Request message and performs authentication before creating a session and providing the UE 102 with a session response. To this end, the business PGW 123 sends an authentication request to the AAA server 502 (Step 516). The authentication request may seek to authenticate the user's request to establish the business tunnel. The AAA server 502 may authenticate the user's access request based on its internal record and/or based on interacting with the HSS 110 (Step 518). In either case, the AAA server 502 sends the authentication result to the business PGW 123 (Step 520). Assuming the user is authorized to establish the business tunnel, the business PGW 123 then determines the traffic profile for the user by sending IP-CAN Session Establishment Procedure message to the PCRF 120 (Step 522). If the PCRF 120 does not have the user's traffic profile, the PCRF downloads user's traffic profile from the HSS 110 (Step 524). If there is no subscription to a profile update notification for the user, the PCRF 120 may subscribe to the profile update notification. The PCRF 120 forwards the user's traffic profile to the business PGW 123 (Step 528).

The business PGW 123 determines whether the destination IP address is among the IP addresses registered with its firewall. If so, the business PGW 123 may check with the OCS 130 to determine whether the enterprise has sufficient funds available for establishing the PDN data connection (Step 530). The OCS 130 provides the business PGW 123 with a response regarding the sufficiency of the enterprise's fund for establishing the PDN data connection (Step 532). If the enterprise does not have sufficient funds and the enterprise is a pre-paid customer, the business PGW 123 may deny the session request and inform the user of the same. If the enterprise has sufficient funds or the enterprise is a post-pay customer, the business PGW 123 sends a Create Session Response message to the SGW 118 (Step 536). The business PGW 123 also sends an AAR message to the AAA server 502 informing the AAA server 502 of the IP address that is being assigned to the UE 102 (Step 534). The AAA server 502 responds with AAA message (552) confirming receipt and providing session ID and result code. After the PDN session establishment is complete, the business PGW 123 sends an ACR-Start message to the CCF 504 (Step 554). The CCF 504 responds with an ACA message to the PGW 122 (Step 556). The start message may indicate to the CCF 504 to start the timer associated with this data session. The business PGW 123 also sends a downlink data to the SGW 118 (Step 558) informing the SGW 118 that the network 100 is ready to accept and download data to the UE 102.

The SGW 118 forwards the Create Session Response message to the MME 112 (Step 538), which may forward E-RAB Setup Request message to the eNB 116 (Step 540). In response, the eNB 116 sends an RPC Connection Reconfiguration message to the UE 102 (Step 542). The RPC Connection Reconfiguration message assigns the IP address to the UE 102 and provides the UE 102 with the radio bearer identity of the eNB 116 for communication with the network 100. The UE 102 informs the eNB 116 that it has completed configuration by sending an RPC Connection Reconfiguration Complete message to the eNB 116 (Step 544). In response, the eNB 116 forwards an E-RAB Setup Response message to the MME 112 (Step 546). The E-RAB Setup Response message indicates to the MME 112 that the UE 102 is in connected mode and can communicate with the network 100. Thereafter, the UE 102 sends to the eNB 116 a UL Information Transfer message (Step 548). The UL Information Transfer message informs the network 100 that the UE 102 is ready to upload data to the network 100. In response, the eNB 116 forwards UL NAS Transport message to the MME 112 (Step 550).

The MME 112 sends a Modify Bearer Request message to the SGW 118 (Step 562). The Modify Bearer Request message informs the SGW 118 of the name of eNB 116 serving the UE 102. The SGW 118 notes the eNB's 116 name and responds back to the MME 112 with a Modify Bearer Response (Step 564). From this point forward, the data communication may happen directly between the UE 102 and the business PGW 123 without having to go to the MME 112.

Figure 6:
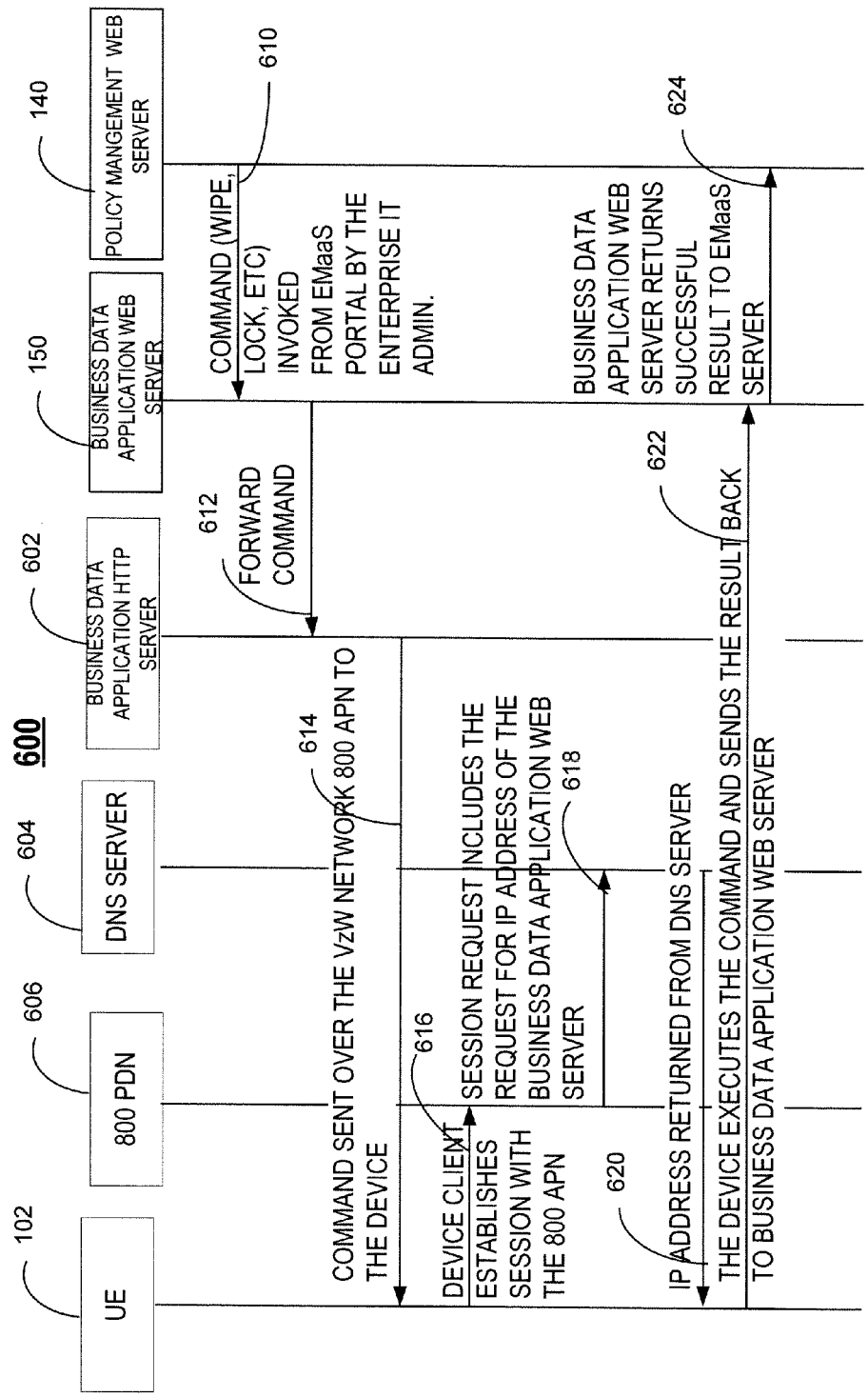
FIG. 6 illustrates an exemplary process for controlling the business data application and its business content via the policy management server and the business data server shown in FIG. 1.

FIG. 6 illustrates an exemplary process 600 for controlling the business data application and its business content via the policy management server 140 and the business data server 150. The enterprise may have full control over the applications that are installed in the business persona, as well as the ability to set password standards, lock the device or the business data application 102a, wipe the business data application 102 from the device as well as other management functions. The enterprise may have the ability to control the business persona via the policy management service offered by the policy management server 140. To accomplish this, the enterprise may utilize the process 600.

The process 600 begins with the enterprise sending a command via the policy management server 140 to the business data server 150 (Step 610). The command may include a wipe command or a lock command and may be invoked by the enterprise IT administrator. In response, the business data server pushes the command to the business data HTTPs server 602 (Step 612), which in turn forwards the command to the UE 102 (Step 614). The business data HTTPs server 602 forwards the command over the 800 APN to the UE 102. In response, the UE 102 establishes session using the 800 APN with the 800 PDN 606 (Step 616). The session request includes the request for IP address of the business data server 150. The 800 PDN 606 forwards the session request to the DNS server 604 (Step 618). The DNS server 604 returns the IP address of the business data web server 150 to the UE 102 (Step 620). In response, the UE 102 executes the command and sends the result back to the business data server 150 (Step 622). The command may be instruction for the UE to contact the enterprise download server to, for example, add an application to the business persona. In response, the UE 102 establishes a connection with the enterprise download server and downloads the application to be added to the business persona. To accomplish this, the UE 102 may establish a new data session with the 800 APN and may request the IP address of the enterprise download server from the DNS server 604. The DNS server 604 provides the IP address of the enterprise download server to the UE 102. In response, the UE 102 connects with the enterprise download server and downloads the application. The UE sends the successful result of the execution to the business data server 150 (Step 622) and the business data server 150 returns successful result to the policy management server 140 (Step 624).

Figure 7:
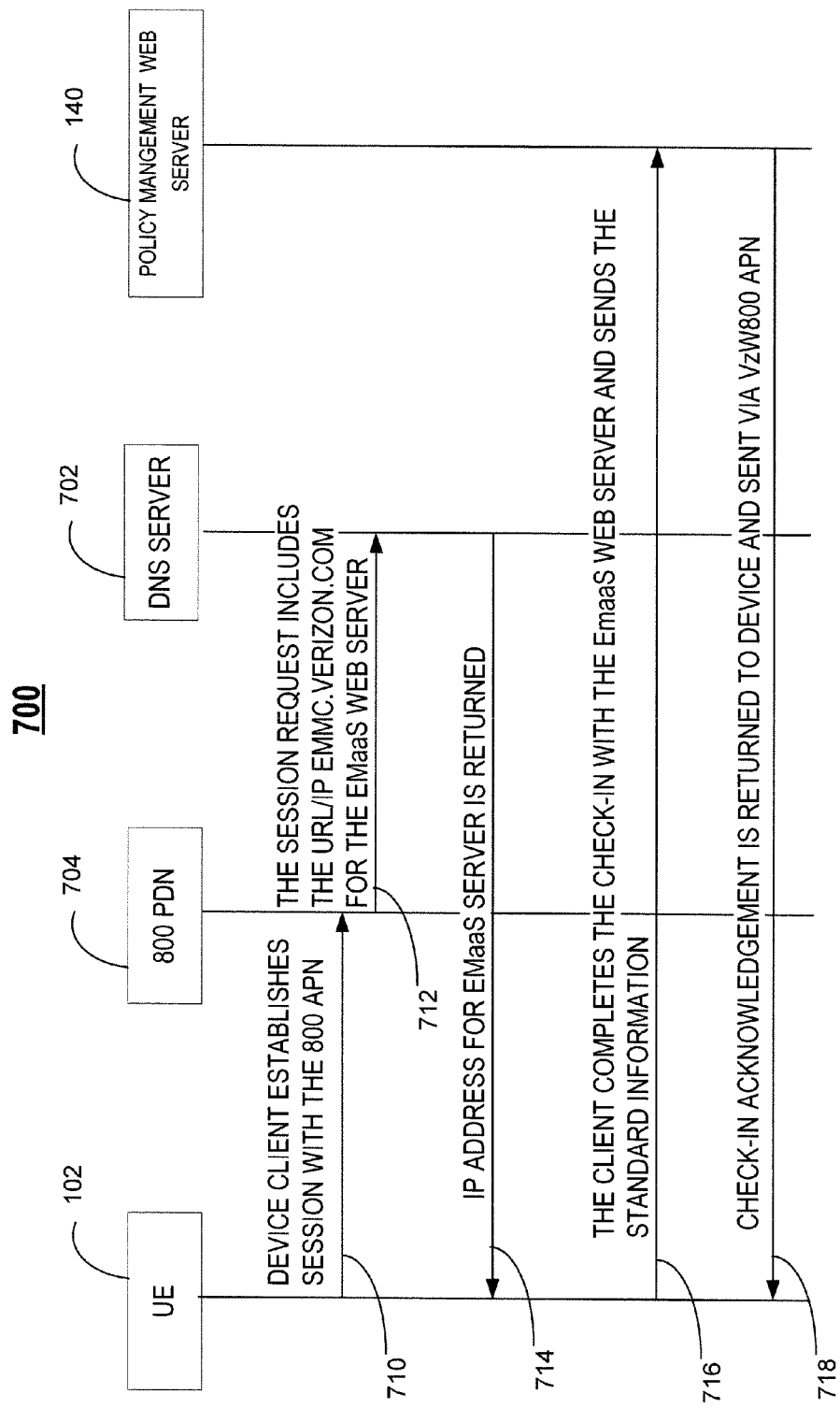
FIG. 7 illustrates an exemplary process for establishing a connection between the UE and the policy management server shown in FIG. 1.

FIG. 7 illustrates an exemplary process 700 for establishing a connection between the UE 102 and the policy management server 140. The process 700 begins with the policy management client on the UE 102 establishing session with 800 PDN 704 (Step 710). The session request may include the URL or the IP address for the policy management server 140. If the session request includes the URL for the policy management server 140, the 800 PDN 704 forwards the session request to the DNS server 702 (Step 712). The DNS server 702 returns the IP address associated with the policy management server 140 (Step 714). In response, the policy management client on the UE 102 completes check-in with the policy management server 140 and sends the standard information (Step 716). The policy management server 140 responds with check-in acknowledgment to the policy management client on the UE 102 (Step 718). The policy management client on the UE 102 may check-in with the policy management server 140 once per day for reporting purposes such as device MDN, MEID, device model, OS, and application installed in the business persona. The timeout for the connection may be several minutes (e.g., 5 minutes). However, if the policy management client on the UE 102 fails to connect within the next 24 hour interval, the policy management client may attempt to connect every 30 minutes until it succeed.

Figure 8:
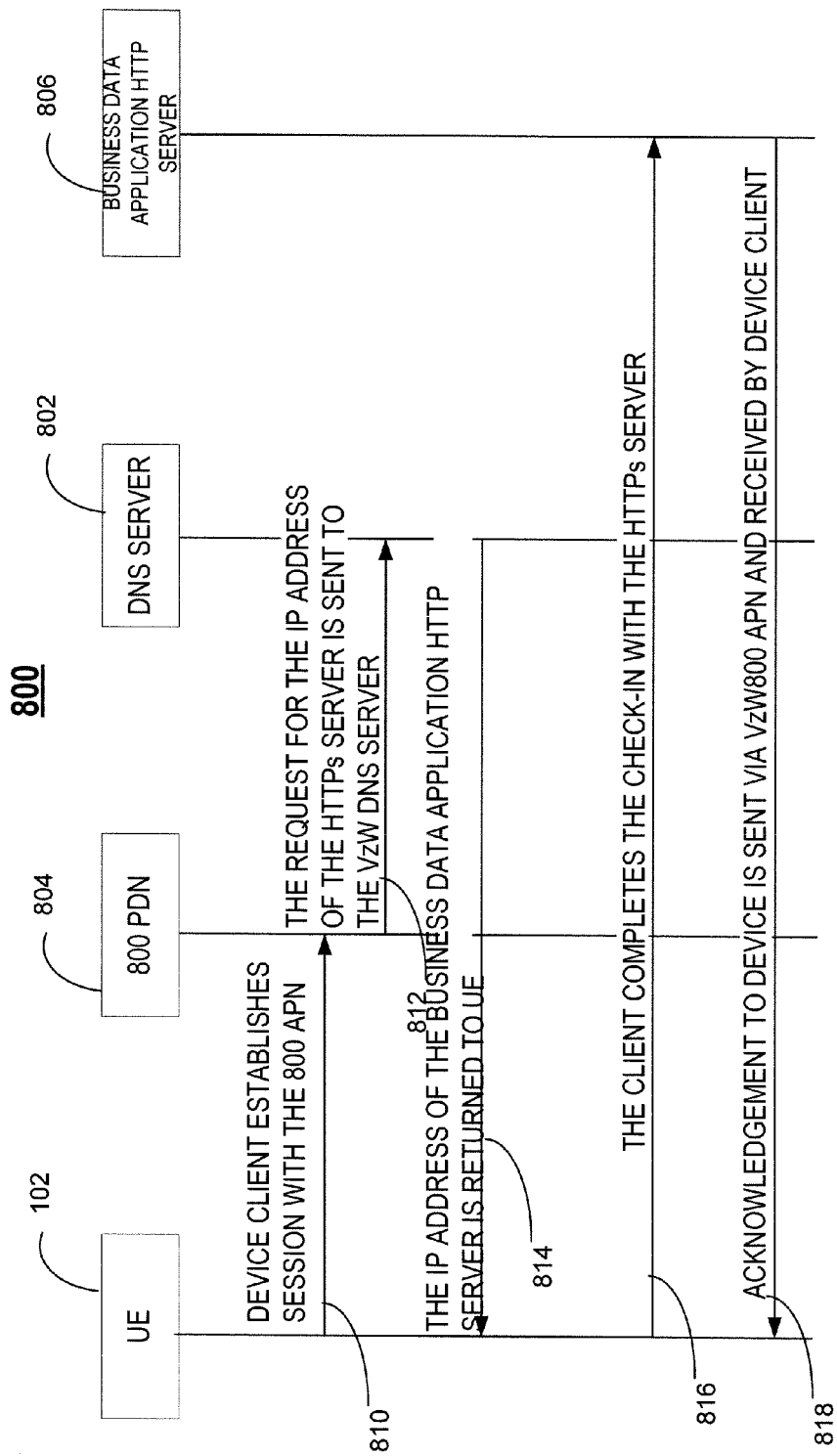
FIG. 8 illustrates an exemplary process for establishing a connection between the UE and the business data server shown in FIG. 1.

FIG. 8 illustrates an exemplary process 800 for establishing a connection between the UE 102 and the business data server 150. The process 800 begins with the business data application 102 establishing session with 800 PDN 804 (Step 810). The session request may include the URL or the IP address for the business data HTTPs server 806. If the session request includes the URL for the business data server 150, the 800 PDN 804 forwards the session request to the DNS server 802 (Step 812). The DNS server 802 returns the IP address associated with the business data HTTPs server 806 (Step 814). In response, the business data application 102a completes check-in with the business data HTTPs server 806 (Step 816). The business data HTTPs server 806 responds with check-in acknowledgment to the business data application 102a (Step 818). The business data application 102a may connect to the business data HTTPs server 806 for communicating keep-alive messaging every several minutes (e.g., 10 minutes). This interval may be OS dependent, but may be less than 30 minutes timeout associated with the 800 APN.

Figure 9:
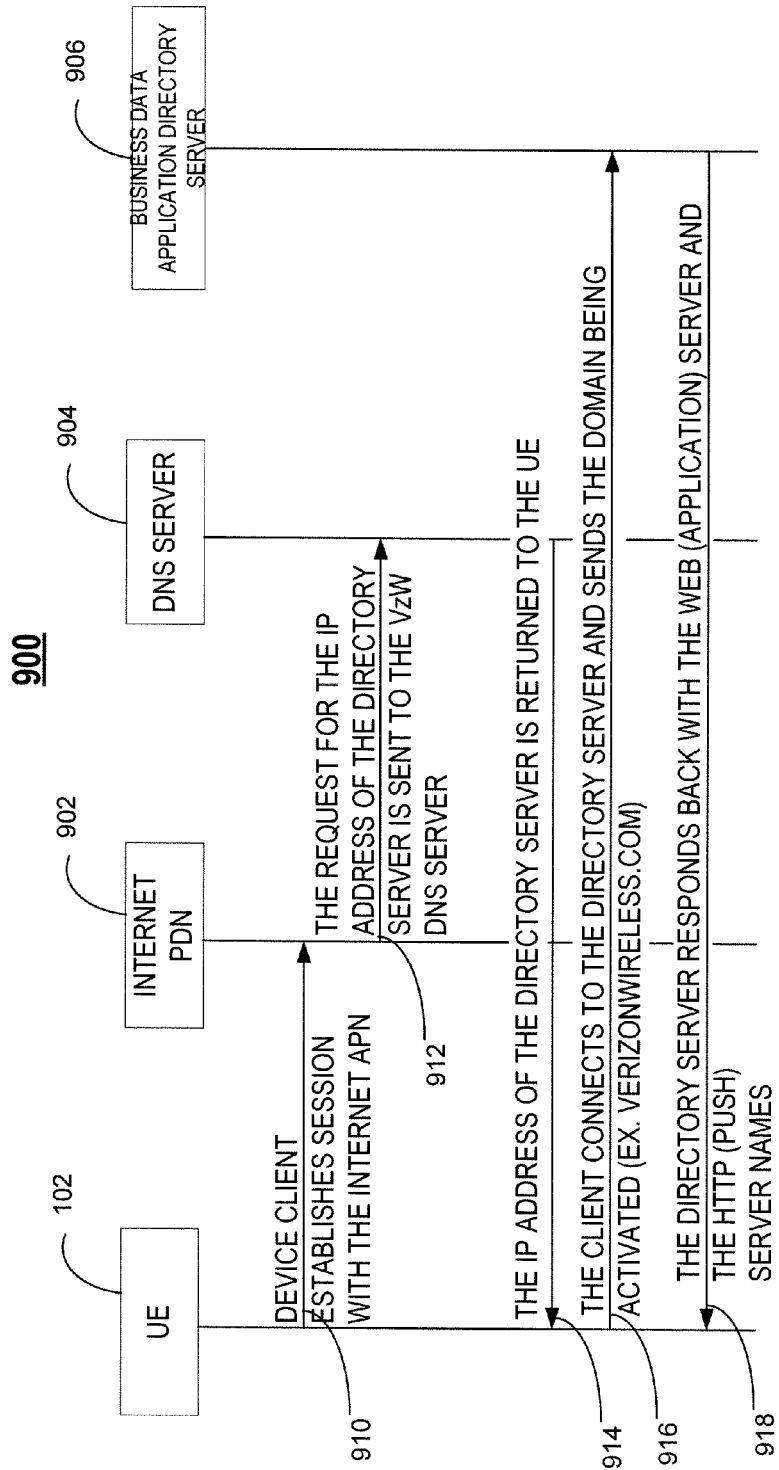
FIG. 9 illustrates an exemplary process for installing enterprise associated policies for the business data application shown in FIG. 1.

FIG. 9 illustrates an exemplary process 900 for installing enterprise associated policies for the installed business data application 102a. Upon installation, the business data application 102a may utilize the Internet APN to connect to the business data directory server 906, which responds to the business data application 102a with the server names to be used for the web and https servers. The business data application 102a may then connect with the identified web and http servers to download the enterprises associated policies for the business data application 102a.

To illustrate further, the process 900 begins with the business data application 102a establishing a session with the Internet PDN 902 requesting the IP address for the business data directory server 906 (Step 910). The Internet PDN 902 forwards the request to the DNS server 904 (Step 912). The DNS server 904 returns the IP address associated with the business data directory server 906 (Step 914). The device client then connects with the business data directory server 906 and sends the domain being activated (e.g., e.g., Verizonwireless.com) (Step 916). In response, the business data directory server 906 provides the name of the web (application) server and the http (push) server to the business data application 102a (Step 918). The business data application may then connect with the identified servers to download the business data associated policies.

As shown by the above discussion, functions relating to providing multiple APN connections support may be implemented on computers connected for data communication via the components of a packet data network, operating as a personal PGW 122, a business POW 123, and the PDN 124 as shown in FIG. 1. Although special purpose devices may be used, such devices also may be implemented using one or more hardware platforms intended to represent a general class of data processing device commonly used to run "server" programming so as to implement the multiple APN connections function on the web browser discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for allowing multiple APN connections support on the UE 102. The software code is executable by the general-purpose computer that functions as the UE 102. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enabling multiple APN connections support on the UE 102, in essentially the manner performed in the implementations discussed and illustrated herein.

Figures 10, 11:
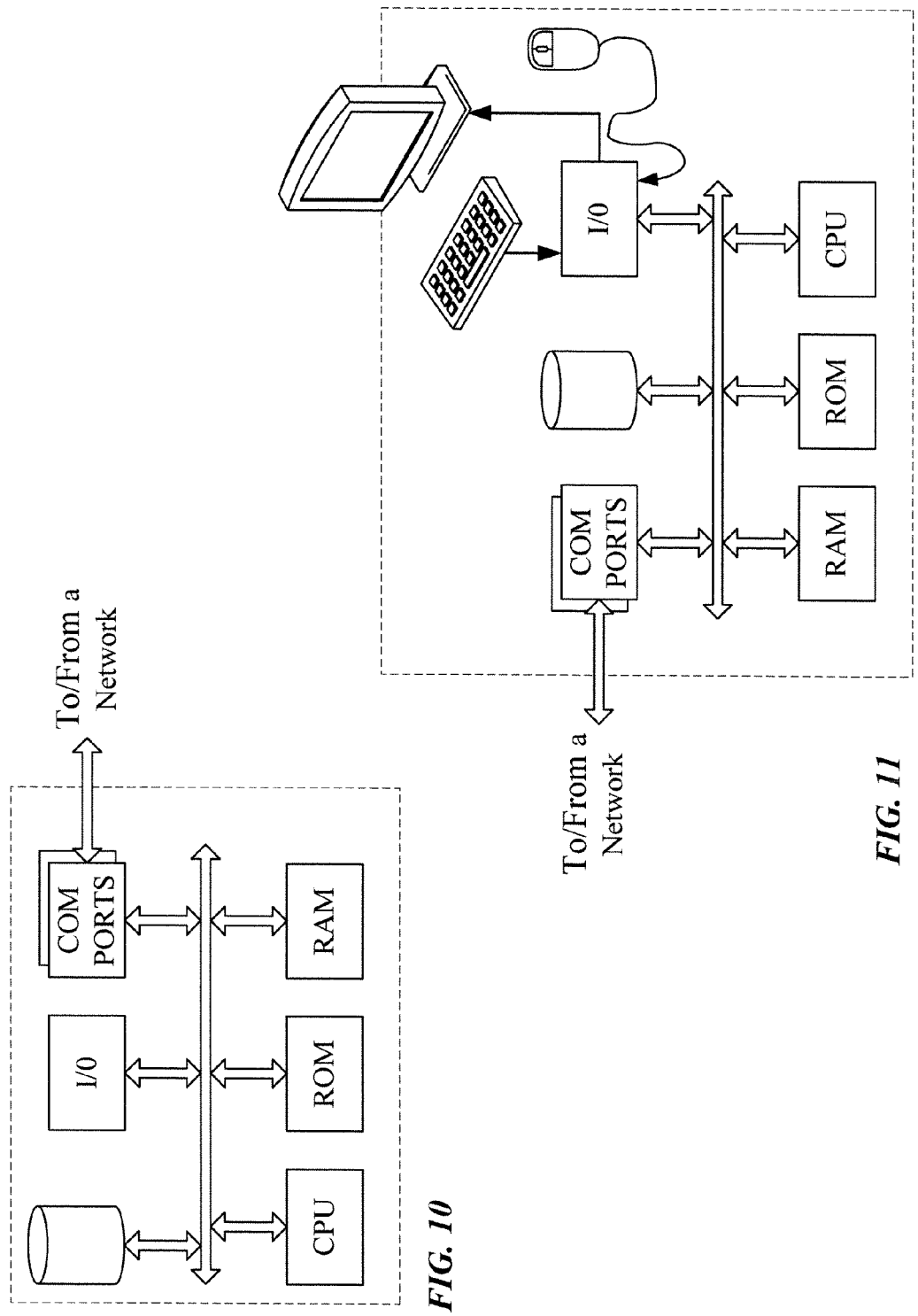
FIG. 10 is a simplified functional block diagram of a computer that may be configured to function as any of the devices of FIG. 1.
FIG. 11 is a simplified functional block diagram of a personal computer or other work station or terminal device that may be configured to function as any of the devices of FIG. 1.

FIGS. 10 and 11 provide functional block diagram illustrations of general purpose computer hardware platforms. FIG. 10 illustrates a network or host computer platform, as may typically be used to implement a server. FIG. 11 depicts a computer with user interface elements, as may be used to implement a personal computer or other type of work station or terminal device, although the computer of FIG. 11 may also act as a server if appropriately programmed. It is believed that the general structure and general operation of such equipment as shown in FIGS. 10 and 11 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 11). A mobile device type user terminal may include similar elements, but may typically use smaller components that also require less power, to facilitate implementation in a portable form factor. The various types of user terminal devices may also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of providing multiple APN connections support outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the communication network provider into the computer platform of the UE 102. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the multiple APN connections support on the UE 102 shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. For example, even though the instant application describes persona-based data billing, the teachings of the instant application can equally apply to persona-based non-data billing such as, for example, to billing associated with telephone calls to and from the employee's mobile station. As a result, minutes usage associated with each telephone call may also be billed based on the persona associated with the telephone call. In this connection and in one specific implementation, the mobile station may have two MDNs associated with it—one for a business persona of the user of the mobile station and one for a personal persona of the user of the mobile station. If the user makes an outgoing call while in the personal persona space (e.g., an environment outside of the business data application 110a), the MDN associated with the personal persona may be used to make the call. If the user makes an outgoing call while in the business persona space (e.g., an environment inside of the business data application 110a), the MDN associated with the business persona may be used to make the call. In this manner, the network 100 can distinguish between the business persona and the personal persona outgoing calls and can charge the appropriate entity (e.g., the employee or the enterprise) for the outgoing calls generated traffic. For incoming calls to the mobile station of the user, the network 100 may distinguish between the types of traffic based on the MDN associated with the incoming call. If the MDN is associated with the business persona of the user, the incoming call may be received within the business space; otherwise, the incoming call may be answered within the personal space on the mobile station. If the user is in the personal space of his/her mobile station and receives the incoming call associated with the user's business persona, the user may receive a notification in a form of a text message for example to answer the call in the business persona space. To this end, the user may activate the business data application 110a and answer the call. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving, from a first client application on a mobile device, a request to exchange first data over a mobile communication network;

upon receiving the request to exchange first data from the first client application, determining whether the first client application is associated with a first persona or a second persona of a user of the mobile device;

upon determining the first client application is associated with the first persona, establishing a first data connection based on a first Access Point Name (APN) network identifier between the device and the mobile communication network and routing the first data over the first data connection;

receiving, from a second client application on the mobile device, a request to exchange second data over a mobile communication network;

upon receiving the request to exchange second data from the second client application, determining whether the second client application is associated with the first persona or the second persona of the user of the mobile device; and upon determining the second client application is associated with the second persona, establishing a second data connection based on a second APN network identifier between the device and the mobile communication network and routing the second data over the second data connection;

wherein the second persona corresponds to a business persona of the user; and wherein one or more elements within the mobile communication network are configured to override the first persona by routing the first data over the second data connection, when it is determined that the first data cannot be routed over the first data connection because of insufficient funds in an account associated with the first persona.

2. The method of claim 1, wherein the first persona corresponds to a personal persona of the user, the business persona is associated with work-related applications of the user and the personal persona is associated with applications other than work-related applications.

3. The method of claim 2, wherein:

determining whether the first client application is associated with the personal persona or the business persona includes determining whether the first client application is housed within the second client application configured to house work-related applications of the user and establish an 800 PDN connection with the mobile communication network, and determining the first client application is associated with the personal persona if the first client application is housed outside of the business data application on the mobile device.

4. The method of claim 2, wherein:

determining whether the second client application is associated with the personal persona or the business persona includes determining whether the second client application is housed a business data application configured to establish an 800 PDN connection with the mobile communication network, and determining the second client application is associated with the business persona if the second client application is housed within the business data application on the mobile device.

5. The method of claim 1, wherein:
the first APN includes an Internet APN and the first data connection includes a connection to an Internet PDN, and
the second APN includes an 800 APN and the second data connection includes a connection to an 800 PDN.

6. The method of claim 1, wherein the second client application is configured to house work-related applications and establish an 800 PDN connection with the network.

7. The method of claim 6, wherein each application housed within the second client application is configured to access an IP address authorized to use the 800 PDN connection.

8. The method of claim 6, further comprising:
requesting the user of the mobile device to provide authentication information for accessing the second client application;
receiving the authentication information; and
upon determining the received authentication information corresponds to authentication information associated with the second client application, enabling the user of the mobile device to access the second client application.

9. A mobile device comprising:
a processor; and
a memory storing executable instructions for causing the processor to:
receive, from a first client application on the mobile device, a request to exchange first data over a mobile communication network;
upon receiving the request to exchange first data from the first client application, determine whether the first client application is associated with a first persona or a second persona of a user of the mobile device;
upon determining the first client application is associated with the first persona, establish a first data connection based on a first APN network identifier between the device and the mobile communication network and route the first data over the first data connection;
receive, from a second client application on the mobile device, a request to exchange second data over a mobile communication network;
upon receiving the request to exchange second data from the second client application, determine whether the second client application is associated with the first persona or the second persona of the user of the mobile device; and
upon determining the second client application is associated with the second persona, establish a second data connection based on a second APN network identifier between the device and the mobile communication network and route the second data over the second data connection;
wherein the second persona corresponds to a business persona of the user; and
wherein one or more elements within the mobile communication network are configured to override the first persona by routing the first data over the second data connection, when it is determined that the first data cannot be routed over the first data connection because of insufficient funds in an account associated with the first persona.

10. The mobile device of claim 9, wherein the first persona corresponds to a personal persona of the user, the business persona is associated with work-related applications of the user and the personal persona is associated with applications other than work-related applications.

11. The mobile device of claim 10, wherein:
to determine whether the first client application is associated with the personal persona or the business persona the memory stores executable instructions for causing the processor to determine whether the first client application is housed within the second client application configured to house work-related applications of the user and establish an 800 PDN connection with the mobile communication network, and
the memory stores executable instructions for causing the processor to determine the first client application is associated with the personal persona if the first client application is housed outside of the business data application on the mobile device.

12. The mobile device of claim 10, wherein:
to determine whether the second client application is associated with the personal persona or the business persona the memory stores executable instructions for causing the processor to determine whether the second client application is housed within a business data application configured to house work-related applications of the user and establish an 800 PDN connection with the mobile communication network, and
the memory stores executable instructions for causing the processor to determine the second client application is associated with the business persona if the second client application is housed within the business data application on the mobile device.

13. The mobile device of claim 9, wherein:
the first APN includes an Internet APN and the first data connection includes a connection to an Internet PDN, and
the second APN includes an 800 APN and the second data connection includes a connection to an 800 PDN.

14. The mobile device of claim 9, wherein the memory stores executable instructions for causing the processor to:
request the user of the mobile device to provide authentication information for accessing the second client application;
receive the authentication information; and
upon determining the received authentication information correspond to authentication information associated with the second client application, enable the user of the mobile device to access the second client application.

15. At least one non-transitory computer readable medium on which are stored instructions comprising instructions that when executed cause a programmable device to:
receive, from a first client application on a mobile device, a request to exchange first data over a mobile communication network;
upon receiving the request to exchange first data from the first client application, determine whether the first client application is associated with a first persona or a second persona of a user of the mobile device;
upon determining the first client application is associated with the first persona, establish a first data connection based on a first Access Point Name (APN) network identifier between the device and the mobile communication network and route the first data over the first data connection;
receive, from a second client application on the mobile device, a request to exchange second data over a mobile communication network;
upon receiving the request to exchange second data from the second client application, determine whether the second client application is associated with the first persona or the second persona of the user of the mobile device; and upon determining the second client application is associated with the second persona, establish a second data connection based on a second APN network identifier between the device and the mobile communication network and route the second data over the second data connection;

wherein the second persona corresponds to a business persona of the user; and wherein one or more elements within the mobile communication network are configured to override the first persona by routing the first data over the second data connection, when it is determined that the first data cannot be routed over the first data connection because of insufficient funds in an account associated with the first persona.

16. The computer readable medium of claim 15, wherein the first persona corresponds to a personal persona of the user, the business persona is associated with work-related applications of the user and the personal persona is associated with applications other than work-related applications.

17. The computer readable medium of claim 15, wherein: the first APN includes an Internet APN and the first data connection includes a connection to an Internet PDN, and the second APN includes an 800 APN and the second data connection includes a connection to an 800 PDN.

18. The computer readable medium of claim 15, wherein the second client application is configured to house work-related applications and establish an 800 PDN connection with the network.

19. The computer readable medium of claim 15, wherein the instructions when executed further cause the programmable device to:

request the user of the mobile device to provide authentication information for accessing the second client application;

receive the authentication information; and upon determining the received authentication information corresponds to authentication information associated with the second client application, enable the user of the mobile device to access the second client application.

* * * * *